Aug. 3, 1926.
I. J. LINDBECK
CONTAINER
Filed Jan. 30, 1926
1,594,535
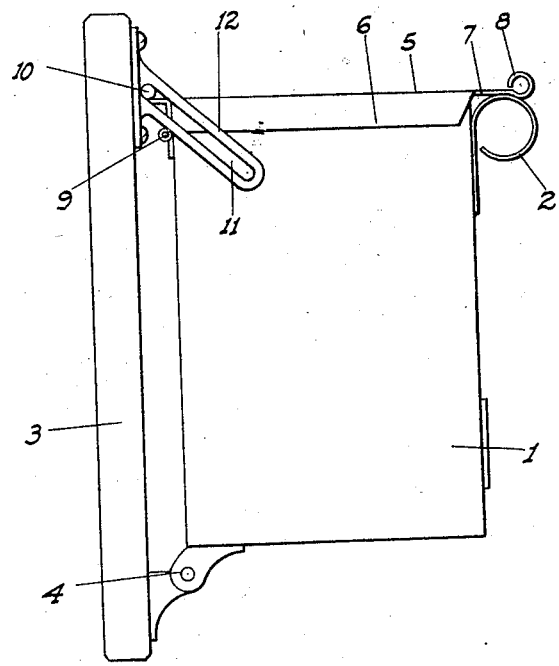
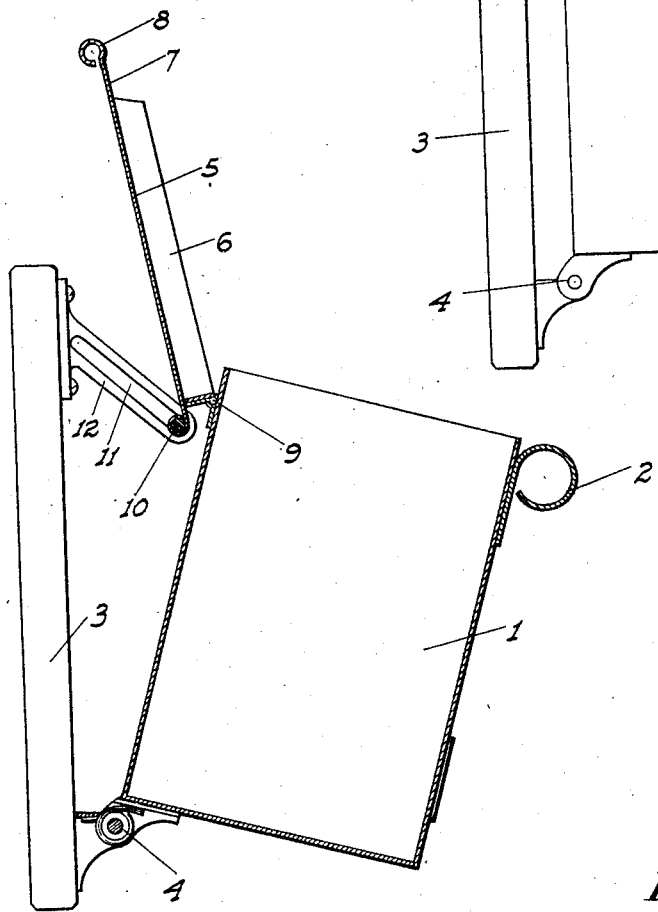
INVENTOR
I.J.Lindbeck
BY
ATTORNEY Patented Aug. 3, 1926.

1,594,535

UNITED STATES PATENT OFFICE.

INGWARD J. LINDBECK, OF TURLOCK, CALIFORNIA.

CONTAINER.

Application filed January 30, 1926. Serial No. 84,852.

This invention relates to improvements in containers, and particularly to a type of container for use in kitchens to contain food ingredients, such as spices, condiments, and the like which are used in connection with cake, pastry and bread making and other cooking.

I have particularly in mind to install my container in a bakery kitchen to hold the ingredients most frequently used by bakers, but the device is also admirably adapted for installation in any restaurant, hotel, or household kitchen for various purposes.

The principal object of my invention is to provide a container for the purpose adapted to be mounted in a fixed position on a wall, so constructed that a pulling movement of the container toward the user will automatically cause the lid of the container to be raised; and when the pull on the container is released the lid will automatically return to a covering position.

This arrangement enables the goods to be kept in a sanitary manner, enclosed against deterioration and contamination with dirt, dust or moisture, while enabling the user to get at such goods with the use of but one hand and without having to manually remove and replace the lid.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of the container with the lid in closed position.

Fig. 2 is a sectional elevation of the container with the lid in open position.

Referring now more particularly to the characters of reference on the drawings, the numeral 1 denotes the container, which is an open topped member preferably of rectangular shape, and having on its front face adjacent its upper end a rigid pull loop 2 in which a finger may be inserted.

A panel 3 is provided with the container at the back of the same, the container being permanently mounted on the panel by a spring hinge 4 of ordinary form, which is disposed at the bottom of the container adjacent the back of the same. This hinge acts to maintain the container in an upright position and to tend to move the same rearwardly toward the panel.

The container is provided with a lid 5' having side flanges 6 to overlap the sides of the container somewhat; and a lip 7 along the front projecting outwardly of the front of the container and terminating in a roll 8 which engages the loop 2 to form a friction catch when the lid is closed. The lid is secured onto the back of the container in a horizontal plane below the top of the container by a hinge 9 of suitable character. The lid projects rearwardly beyond the container and hinge and carries on its rear end a horizontal rod 10 which extends lengthwise of the container and at its opposite ends is slidably disposed in guide slots 11 which are formed in brackets 12 mounted on the panel 3. These slots are disposed at an acute downward angle from their rear ends nearest the panel, the rod 10 being at the upper end of the slots when the container is in a vertical position, and the lid being then closed on the container.

By means of this arrangement when the loop 2 is engaged and pulled the container is swung forward on its hinge 4, and the lid hinge 9 of course follows the container on an arcuate line whose center is the hinge 4. The rod 10 however can only follow the slope of the slots 11, which of course are disposed in a different line from the arcuate line of movement of the hinge 9. The result is that as the container is thus pulled forward the lid is caused to open, the downward and outward movement of the container, and the subsequent opening of the lid being limited by the rod 10 engaging the lower and outer ends of the slots. Upon the pressure on the loop 2 being removed the spring hinge 4 acts to restore the container to its normal position, causing the lid to be again closed.

The panel 3 is adapted to be fixed onto a wall by any suitable means and any desired number of alined containers, each independent of each other, may be mounted on a single panel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A container structure comprising a body member, a lid hinged thereto, means on which the body is turnably mounted for movement in a vertical plane supporting and normally holding the body in a predetermined position, and means for causing the lid to be closed when the body is in such position and for causing the lid to be opened when the body is turned on its support from said position.

2. A container structure comprising a body member, a lid hinged thereto, means on which the body is turnably mounted for movement in a vertical plane supporting and normally holding the body in a predetermined position, guide members mounted in a fixed position relative to the body, and means mounted in connection with the lid and engaging the guides; the latter being disposed relative to the pivotal connection of the body and to the hinge to cause the lid to be closed when the body is in such predetermined position and to be opened when the body is turned from said position.

3. A container structure comprising a body member, a lid hinged thereto along the back thereof, hinge means at the bottom of the body adapted to be mounted in a fixed position, guide members at the sides of the body fixed relative thereto and sloping downwardly and outwardly from adjacent the body, and a member fixed on the lid and engaging the guide members.

In testimony whereof I affix my signature.

INGWARD J. LINDBECK.